United States Patent
Herrig et al.

(10) Patent No.: US 10,677,217 B2
(45) Date of Patent: Jun. 9, 2020

(54) WIND TURBINE AND METHOD OF OPERATING THE SAME

(71) Applicant: General Electric Company, Schenectady, NY (US)

(72) Inventors: Andreas Herrig, Bavaria (DE); Biju Nanukuttan, Jr., Karnataka (IN); Christian Aloysius Carroll, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 933 days.

(21) Appl. No.: 14/145,257

(22) Filed: Dec. 31, 2013

(65) Prior Publication Data
US 2014/0112780 A1    Apr. 24, 2014

Related U.S. Application Data

(63) Continuation-in-part of application No. 13/644,130, filed on Oct. 3, 2012, and a continuation-in-part of application No. 13/852,241, filed on Mar. 28, 2013.

(51) Int. Cl.
*F03D 7/02*   (2006.01)
*F03D 1/06*   (2006.01)

(52) U.S. Cl.
CPC ........... *F03D 7/022* (2013.01); *F03D 1/0641* (2013.01); *F03D 1/0683* (2013.01);
(Continued)

(58) Field of Classification Search
CPC ........ F03D 7/022; F03D 7/024; F03D 7/0224; F03D 7/0236; F03D 1/0608;
(Continued)

(56) References Cited

U.S. PATENT DOCUMENTS 2,400,388 A    5/1946   Campbell
2,428,936 A   10/1947   Hunter
(Continued)

FOREIGN PATENT DOCUMENTS

EP    1442976 B2    6/2010
EP    1828599 B1    9/2011
(Continued)

OTHER PUBLICATIONS

Barlas et al., "Smart Rotor Blades and Rotor Control for Wind Turbines—State of the Art", Knowledge Base Report for Upwind WP 1B3, 98 pages, Delft University Wind Energy Research Institute, The Netherlands.
(Continued)

*Primary Examiner* — David E Sosnowski
*Assistant Examiner* — Wayne A Lambert
(74) *Attorney, Agent, or Firm* — Dority & Manning, P.A.

(57) ABSTRACT

A wind turbine includes at least one blade having a pressure side, a suction side, a leading edge, and a trailing edge that define an airfoil-shaped profile. The suction side and/or the pressure side has a morphable region. The wind turbine also includes a control system configured to activate the morphable region to alter the airfoil-shaped profile and reduce negative lift generated by the blade when the blade is oriented at a negative lift angle.

15 Claims, 6 Drawing Sheets

(52) U.S. Cl.
CPC ..... *F05B 2240/301* (2013.01); *F05B 2240/31* (2013.01); *F05B 2260/962* (2013.01); *Y02E 10/721* (2013.01); *Y02E 10/723* (2013.01)

(58) Field of Classification Search
CPC .... F03D 1/0633; F03D 1/0641; F03D 1/0658; F03D 1/0675; F03D 1/0683; F03D 80/40; F05B 2240/30; F05B 2240/31; F05B 2240/311; F05B 2260/96; F05B 2260/962; B64C 11/346; B64C 2027/7261; Y02E 10/723; Y02E 10/721
USPC .......................................................... 416/23
See application file for complete search history.

(56) References Cited

U.S. PATENT DOCUMENTS

| | | | | |
|---|---|---|---|---|
| 2,493,895 | A * | 1/1950 | Osterback | F03D 7/0252 416/132 B |
| 2,625,997 | A * | 1/1953 | Doak | B64C 27/46 416/145 |
| 3,136,501 | A | 6/1964 | Barber | |
| 4,039,161 | A * | 8/1977 | Bauer | B64C 23/06 138/39 |
| 4,082,479 | A * | 4/1978 | Rangi | F03D 7/06 416/169 R |
| 4,692,095 | A * | 9/1987 | Lawson-Tancred | F03D 7/0252 416/169 R |
| 4,715,782 | A * | 12/1987 | Shimmel | F03D 7/0252 416/169 R |
| 5,058,837 | A * | 10/1991 | Wheeler | B64C 23/06 244/198 |
| 5,106,265 | A | 4/1992 | Holzem | |
| 5,320,491 | A * | 6/1994 | Coleman | F03D 7/0252 244/213 |
| 5,405,246 | A * | 4/1995 | Goldberg | F03D 3/061 416/227 A |
| 5,417,548 | A * | 5/1995 | Tangler | F03D 1/0641 416/223 R |
| 5,433,404 | A | 7/1995 | Ashill et al. | |
| 5,474,425 | A * | 12/1995 | Lawlor | F03D 1/065 416/223 R |
| 5,570,859 | A * | 11/1996 | Quandt | B64C 9/18 244/113 |
| 6,068,446 | A * | 5/2000 | Tangler | F03D 1/0641 416/223 R |
| 6,076,776 | A * | 6/2000 | Breitbach | B64C 3/48 244/214 |
| 6,105,904 | A * | 8/2000 | Lisy | B64C 3/58 244/130 |
| 6,142,425 | A * | 11/2000 | Armanios | B64C 9/38 239/562 |
| 6,443,394 | B1 | 9/2002 | Weisend, Jr. | |
| 6,940,185 | B2 * | 9/2005 | Andersen | F03D 1/0608 290/44 |
| 8,061,986 | B2 | 11/2011 | Xiong | |
| 8,083,491 | B2 | 12/2011 | Rueda et al. | |
| 8,113,470 | B1 * | 2/2012 | Motosko, III | B64C 3/48 244/219 |
| 8,128,364 | B2 * | 3/2012 | Pesetsky | F03D 1/0675 415/4.3 |
| 8,157,533 | B2 | 4/2012 | Godsk et al. | |
| 8,167,554 | B2 * | 5/2012 | Wang | F03D 1/0608 244/204.1 |
| 8,192,161 | B2 * | 6/2012 | Baker | F03D 1/0641 416/23 |
| 8,206,107 | B2 * | 6/2012 | Dawson | F03D 1/0675 416/223 R |
| 8,222,757 | B2 | 7/2012 | Schulten | |
| 8,246,311 | B2 * | 8/2012 | Pesetsky | F03D 1/06 416/231 R |
| 8,267,654 | B2 * | 9/2012 | van Dam | F03D 1/06 416/14 |
| 8,444,384 | B2 * | 5/2013 | Pesetsky | F03D 7/0232 244/204.1 |
| 8,647,059 | B1 * | 2/2014 | Szefi | B64C 27/72 416/1 |
| 9,267,491 | B2 * | 2/2016 | Vossler | F03D 7/0252 |
| 9,670,900 | B2 | 6/2017 | Carroll et al. | |
| 2003/0091436 | A1 * | 5/2003 | Stiesdal | F03D 1/0641 416/1 |
| 2004/0069906 | A1 | 4/2004 | Dockter et al. | |
| 2004/0105752 | A1 * | 6/2004 | Wobben | F03D 1/0641 415/4.1 |
| 2006/0140760 | A1 * | 6/2006 | Saddoughi | F03D 1/0608 416/23 |
| 2008/0240923 | A1 * | 10/2008 | Bonnet | F03D 1/0633 416/223 R |
| 2009/0226324 | A1 * | 9/2009 | Garcillan Rueda | F03D 1/0641 416/223 R |
| 2009/0304505 | A1 * | 12/2009 | Wobben | G01W 1/00 416/1 |
| 2009/0311096 | A1 * | 12/2009 | Herr | F03D 7/0224 416/42 |
| 2010/0104436 | A1 * | 4/2010 | Herr | F03D 1/06 416/31 |
| 2011/0142664 | A1 * | 6/2011 | Anjuri | F03D 7/0236 416/228 |
| 2012/0104181 | A1 | 5/2012 | Rix | |
| 2012/0134803 | A1 * | 5/2012 | McGrath | F03D 7/0252 416/1 |
| 2012/0134814 | A1 * | 5/2012 | McGrath | F03D 7/0252 416/23 |
| 2012/0134815 | A1 * | 5/2012 | Carroll | F03D 1/0675 416/23 |
| 2012/0141271 | A1 * | 6/2012 | Southwick | F03D 1/0633 416/23 |
| 2012/0141278 | A1 * | 6/2012 | Carroll | F03D 1/0641 416/147 |
| 2012/0256424 | A1 | 10/2012 | Marin | |
| 2013/0209255 | A1 * | 8/2013 | Pesetsky | F03D 1/0633 416/9 |
| 2013/0287588 | A1 | 10/2013 | Shim et al. | |
| 2014/0093380 | A1 | 4/2014 | Drobietz et al. | |
| 2014/0271213 | A1 * | 9/2014 | Yarbrough | F03D 1/0641 416/223 R |
| 2014/0356181 | A1 * | 12/2014 | Mailly | F03D 1/0641 416/229 A |

FOREIGN PATENT DOCUMENTS

| | | |
|---|---|---|
| WO | 0001578 A1 | 1/2000 |
| WO | 0017046 A1 | 3/2000 |
| WO | 2011097024 A1 | 8/2011 |
| WO | 2012146252 A2 | 11/2012 |

OTHER PUBLICATIONS

Hühne, "An Experimental and Numerical Study of Separation Delay on Airfoils with Bumps", 12 pages, Institute of Fluid Mechanics, Braunschweig, Germany.

http://www.auxetix.com/science.htm.

Pechlivanoglou, "Passive and active flow control solutions for wind turbine blades", 236 pages.

Diaconu et al., "Concepts for morphing airfoil sections using bi-stable laminated composite structures", Department of Aerospace Engineering, University of Bristol, UK, ScienceDirect, Thin-Walled Structures 46 (2008), pp. 689-701.

Quirante, "Control of Wind Turbines for Power Regulation and Load Reduction", Technical University of Denmark, 2007, 174 pages.

Pechlivanoglou et al., "Passive and active flow control solutions for wind turbine blades", University of Berlin, Feb. 21, 2012, 237 pages.

(56) References Cited

OTHER PUBLICATIONS

Diaconu et al., "Concepts for morphing airfoil sections using bi-stable laminated composite structures", Department of Aerospace Engineering, University of Bristol, UK, 1 page Abstract, Jun. 6, 2008.
Sobieczky, "Parametric Airfoils and Wings", Notes on Numerical Fluid Mechanics, vol. 68, Vieweg Verlag, 1998, pp. 71-88.
Krause et al., "Improving Wind Turbine Efficiency through Whales-Inspired Blade Design", Harvey Mudd College Center for Environmental Studies, Oct. 5, 2009, p. 1-16.
http://www.pegasus-europe.org/AIAA_Pegasus/Papers/Huehne_Braunschweig.pdf.
http://research-information.bris.ac.uk/explore/en/publications/concepts-for-morphing-airfoil-sections-using-bistable-laminated-composite-structures(3577efb6-74c8-44b7-9132-76267796a518).html.
Diaz et al., "Passive Load Alleviation Morphing Airfoils for Wind Turbine Blades", Jan. 8, 2012, 5 pages; (hhttps://www.rdb.ethz.ch/projects/project.php?proj_id=28988&z_detailed=1&z_popular=1&z_keywords=1).
http://www. upwind .eu/media/915/Upwind_D1B31_State-of-the-Art_Knowledge-base-report.pdf.
Baek et al., "Experimental Detection of Transition on Wind Turbine Airfoils" LM Glasfiber A/S, Denmark, Mar. 19, 2009, 10 pages (http://proceedings.ewea.org/ewec2009/allfiles2/302_EWEC2009presentation.pdf).
U.S. Appl. No. 13/779,829, filed Feb. 28, 2013 (Unpublished).
Prock et al., "Morphing Airfoil Shape Change Optimization with Minimum Actuator Energy as an Objective", American Institute of Aeronautics and Astronautics, pp. 1-13, 2002.
Secanell et al., "Design of a Morphing Airfoil Using Aerodynamic Shape Optimization", AIAA Journal, vol. No. 14, Issue No. 07, pp. 1550-1562, Jul. 2006.
Namgoong et al., "Aerodynamic Optimization of a Morphing Airfoil Using Energy as an Objective", AIAA Journal, vol. No. 45, Issue No. 09, pp. 2113-2124, Sep. 2007.
Baker et al., "The Design of Morphing Aerofoils using Compliant Mechanisms", 19th International Conference on Adaptive Structures and Technologies, Switzerland, pp. 1-10, Oct. 6-9, 2008.
Suzuki et al., "Laminar Airfoil Modification Attaining Optimum Drag Reduction by Use of Airfoil Morphing", Journal of Aircraft, vol. No. 47, Issue No. 04, pp. 1126-1132, Jul.-Aug. 2010.

\* cited by examiner

WIND TURBINE AND METHOD OF OPERATING THE SAME

CROSS-REFERENCE TO RELATED APPLICATIONS

This application is a continuation-in-part of U.S. patent application Ser. No. 13/644,130, filed Oct. 3, 2012, and U.S. patent application Ser. No. 13/852,241, filed Mar. 28, 2013, both of which are incorporated by reference herein in their entirety.

BACKGROUND

The subject matter described herein relates generally to wind energy and, more particularly, to a wind turbine and a method of operating the same.

Many known wind turbines include a tower and a rotor mounted on the tower via a nacelle. The rotor includes a number of blades that rotate to drive a generator through a gearbox via a rotor shaft, and the gearbox steps up the inherently low rotational speed of the rotor shaft such that the generator may convert the mechanical energy to electrical energy with a frequency closer to that of a local power grid. However, the annual energy production (AEP) of most known wind turbines is limited by inefficiencies associated with the construction and function of the blades.

BRIEF DESCRIPTION

In one aspect, a wind turbine is provided. The wind turbine includes at least one blade having a pressure side, a suction side, a leading edge, and a trailing edge that define an airfoil-shaped profile. The pressure side has a morphable region. The wind turbine also includes a control system configured to activate the morphable region to alter the airfoil-shaped profile and reduce negative lift generated by the blade when the blade is oriented at a negative lift angle.

In another aspect, a wind turbine is provided. The wind turbine includes at least one blade having a pressure side, a suction side, a leading edge, and a trailing edge that define an airfoil-shaped profile. The suction side has a morphable region. The wind turbine also includes a control system configured to determine whether the blade is in a clean condition or a rough condition and activate the morphable region based upon the determination.

In another aspect, a method of operating a wind turbine is provided. The method includes adjusting a pitch of a blade using a control system such that the blade transitions from a positive lift angle to a negative lift angle. The method further includes activating a morphable region of the blade to alter an airfoil-shaped profile of the blade and reduce negative lift generated by the blade when the blade is oriented at the negative lift angle.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

The embodiments disclosed herein facilitate altering the airfoil contour of a wind turbine blade by actively deploying a protrusion on the blade to control the aerodynamic behavior of the blade. The embodiments facilitate influencing the boundary layer development of a wind turbine blade by reshaping various regions of the airfoil contour such as, for example: the main pressure recovery region to control separation; the favorable pressure gradient region to shift the natural transition location; and/or the leading edge region to control initial flow conditions for the main pressure recovery. The devices, systems, and methods disclosed herein further facilitate reducing loads on a wind turbine, which enables providing the wind turbine with longer blades that are lighter, i.e., have less mass, due to the reduction in structural support materials that results from the reduced loading. Additionally, the embodiments disclosed herein facilitate modulating the airfoil contour of a wind turbine blade between clean/rough blade conditions, thereby improving the efficiency and reducing the noise of the wind turbine. The devices, systems, and methods thereby facilitate increasing the useful life and efficiency of a wind turbine.

Figure 1:
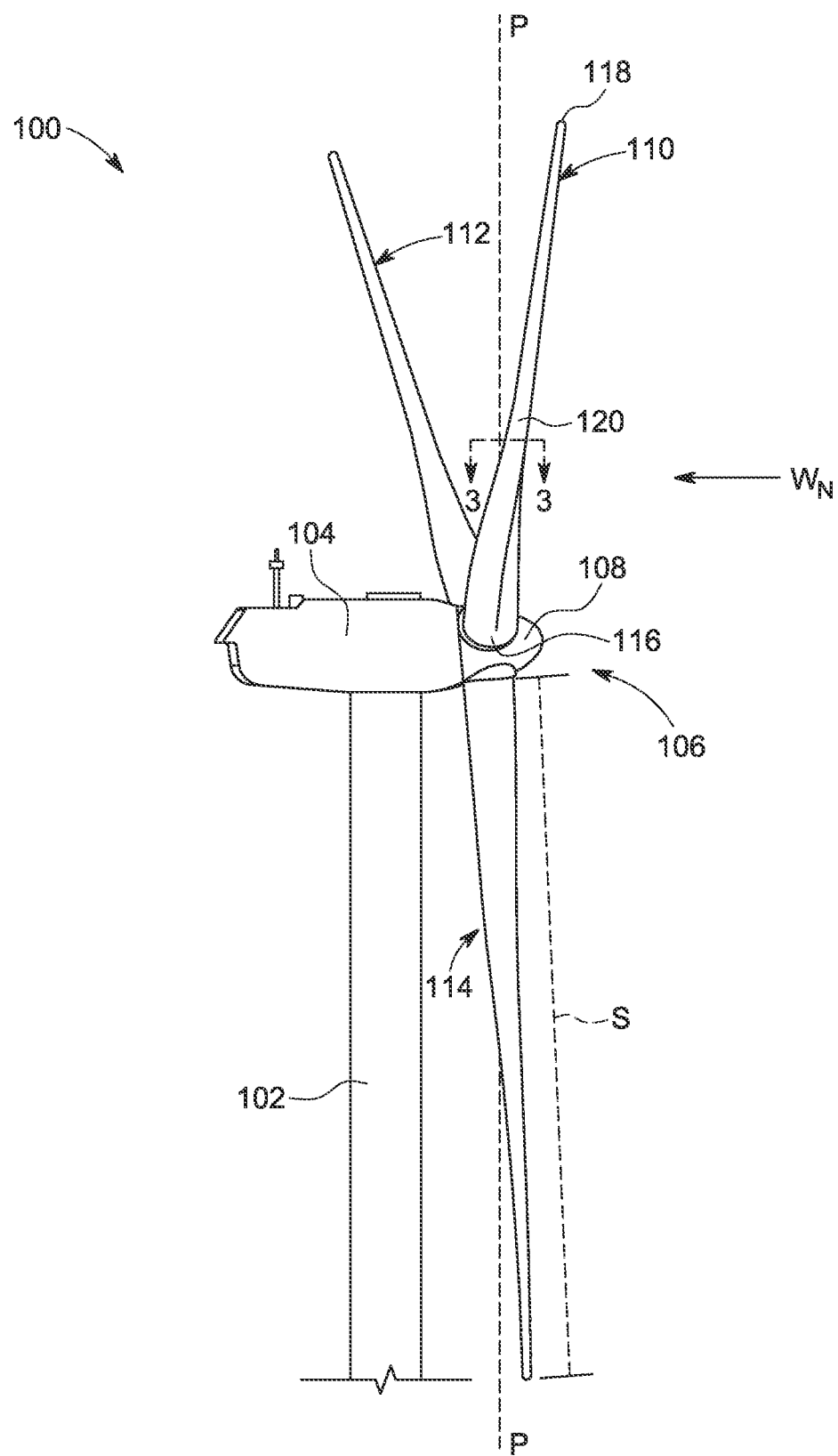
FIG. 1 is a schematic side view of an exemplary wind turbine.

FIG. 1 is a schematic side view of a wind turbine 100. In the exemplary embodiment, wind turbine 100 is a horizontal axis wind turbine that includes a tower 102, a nacelle 104 mounted on tower 102, and a rotor 106 that is rotatable relative to nacelle 104. Rotor 106 includes a hub 108 and a plurality of blades extending outward from hub 108, namely a first blade 110, a second blade 112, and a third blade 114 that are substantially equidistantly spaced about hub 108. Each blade 110, 112, 114 has a root 116, a tip 118, and a body 120 extending from root 116 to tip 118. Root 116 of each blade 110, 112, 114 is suitably configured for operative connection to hub 108 such that, when blades 110, 112, 114 are coupled to hub 108 at their respective roots 116, each blade 110, 112, 114 has a span S from hub 108. In other embodiments, rotor 106 may include any suitable number of blades 110, 112, 114 spaced any suitable distance from one another about hub 108.

Figure 2:
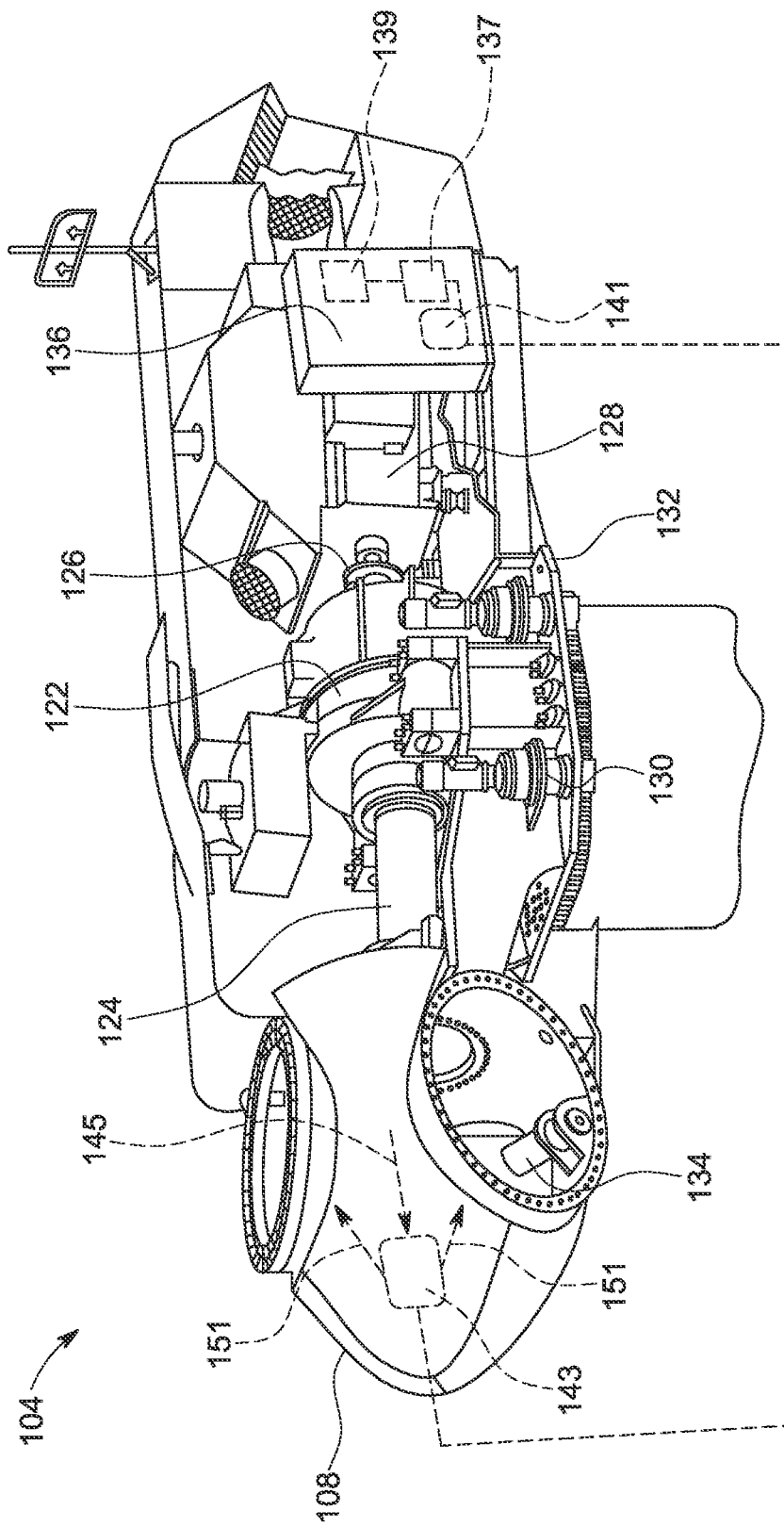
FIG. 2 is a perspective cutaway view of a nacelle of the wind turbine shown in FIG. 1.

FIG. 2 is a perspective cutaway view of nacelle 104. In the exemplary embodiment, nacelle 104 includes a gear box 122, a rotor shaft 124, a high-speed shaft 126, and a generator 128. Rotor shaft 124 rotatably couples hub 108 to gear box 122, and high-speed shaft 126 rotatably couples gear box 122 to generator 128. Nacelle 104 also includes: a yaw drive 130 and a yaw deck 132 that facilitate adjusting the yaw of wind turbine 100; a pitch drive 134 associated with each blade 110, 112, 114 to facilitate independently adjusting the pitch of each blade 110, 112, 114; and a control system 136 that facilitates controlling wind turbine 100, e.g., without limitation, controlling pitch drive 134, yaw drive 130, and a pump 143 as set forth in more detail below. In alternative embodiments, control system 136 may be mounted at any suitable location on (or remotely apart from) wind turbine 100 that enables control system 136 to function as described herein.

In the exemplary embodiment, control system 136 suitably includes at least one processor 137, a memory device 139 coupled to processor 137, and at least one input/output (I/O) conduit 141, wherein I/O conduit 141 includes at least one I/O channel. As used herein, the term processor broadly refers to a microcontroller, a microcomputer, a programmable logic controller (PLC), an application specific integrated circuit, and other suitable programmable circuits. In the embodiments described herein, memory device 139 may include, but is not limited to, a computer-readable medium, such as random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used.

In the embodiments described herein, the I/O channels are associated with, but not limited to, computer peripherals associated with an operator interface such as a mouse and a keyboard. Alternatively, in other embodiments, other computer peripherals are also used such as, but not limited to, an operator interface monitor or a communications link for locally (or remotely) controlling wind turbine 100 in the manner set forth herein. Moreover, processor 137 processes information transmitted from a plurality of electronic devices utilized on wind turbine 100, including, without limitation, a network of sensors dispersed throughout wind turbine 100 such as, for example, airflow sensors, vibration sensors, noise sensors, etc. Memory device 139 stores and transfers information and instructions to be executed by processor 137. Memory device 139 also stores and provides temporary variables, static, i.e., non-volatile and non-changing, information and instructions, or other intermediate information to processor 137 during execution of instructions by processor 137. Instructions that are executed include, but are not limited to, analysis of signals transmitted from the sensors. The execution of sequences of instructions is not limited to any specific combination of hardware circuitry and software instructions. As used herein, wind turbine 100 as a whole is said to be "operating" or "operated" when rotor 106 is rotating, regardless of whether wind turbine 100 is online, is generating power, is being controlled by control system 136, or is otherwise fully functional.

Figure 3:
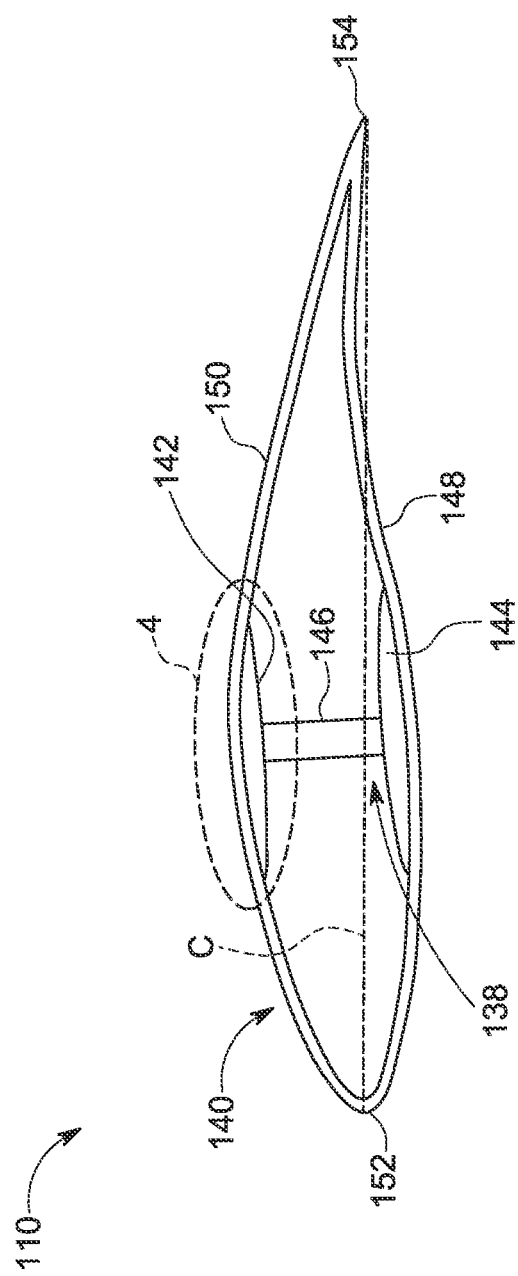
FIG. 3 is schematic cross-sectional view of a blade of the wind turbine shown in FIG. 1 taken along line 3-3 of FIG. 1.
Figure 4:
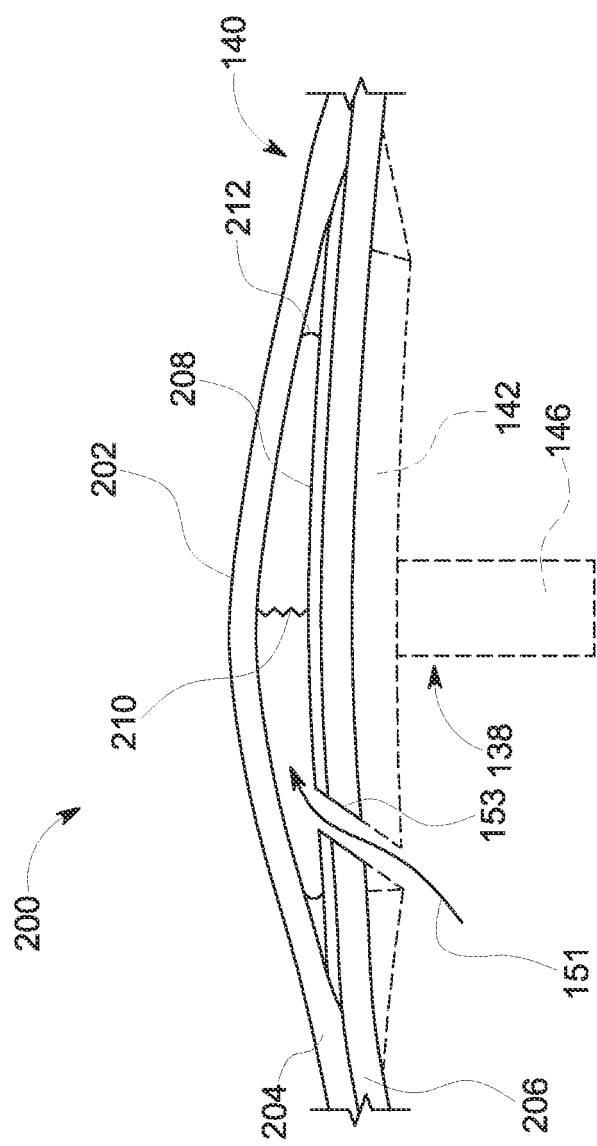
FIG. 4 is an enlarged portion of the cross-sectional view of FIG. 3 taken within area 4 of FIG. 3.

FIG. 3 is schematic cross-sectional view of first blade 110 taken along line 3-3 of FIG. 1, and FIG. 4 is an enlarged portion of the cross-sectional view of FIG. 3 taken within area 4 of FIG. 3. It should be noted that, while first blade 110 is described in more detail below, second blade 112 and third blade 114 may be configured in the same manner as first blade 110. In the exemplary embodiment, first blade 110 has a spanwise extending spar 138 and a shell 140 enveloping spar 138 such that spar 138 provides structural support for shell 140. Spar 138 has a first spar cap 142, a second spar cap 144, and a shear web 146 extending from first spar cap 142 to second spar cap 144. Shell 140 has a pressure side 148, a suction side 150, a leading edge (or face) 152, and a trailing edge (or face) 154. Pressure side 148 and suction side 150 are joined together at leading edge 152 and trailing edge 154 to define an airfoil-shaped profile having a chord C. In alternative embodiments, spar 138 has any suitable arrangement of support member(s), e.g., without limitation, spar 138 may be of a box-type construction, rather than an I-beam construction. Moreover, shell 140 may have any suitable profile shape that facilitates enabling first blade 110 to function as described herein.

Notably, shell 140 includes a morphable region 200 (shown in FIG. 4) at which the airfoil-shaped profile of first blade 110 may be altered by actively deploying a protrusion 202 on the exterior of shell 140. In the exemplary embodiment, morphable region 200 of shell 140 includes a skin 204, e.g., without limitation, a flexible laminate, and morphable region 200 of shell 140 also includes a base layer 206, e.g., without limitation, a rigid composite, underneath skin 204 such that skin 204 is displaceable relative to base layer 206 to form protrusion 202. In one embodiment, a substrate 208, e.g., without limitation, a foil or a film, is disposed between skin 204 and base layer 206 so as to provide a localized inhibition against skin 204 bonding or otherwise being fixed to base layer 206, thereby rendering skin 204 displaceable relative to base layer 206. In another embodiment, a shape-defining tether 210 is disposed between skin 204 and base layer 206 to facilitate limiting the displacement of skin 204 relative to base layer 206, thereby controlling the contour of protrusion 202.

In the exemplary embodiment, wind turbine 100 is provided with a suitable activation device such as, for example, a pneumatic (or hydraulic) pump 143 (shown in FIG. 2) that injects a pressurized fluid 151 between skin 204 and base layer 206 via a valved port 153 to displace (or lift) skin 204 away from base layer 206 to form protrusion 202. For example, an inflatable tube 212 or other suitable fluid-containing member may optionally be disposed between substrate 208 and skin 204 to facilitate containing pressurized fluid 151. Suitably, skin 204 is also displaceable toward base layer 206 in the exemplary embodiment by evacuating pressurized fluid 151 from between skin 204 and base layer 206 to generate a vacuum that pulls skin 204 toward base layer 206, thereby returning morphable region 200 to its inactivated form or, optionally, creating a depression in the airfoil-shaped profile of first blade 110. In this manner, morphable region 200 is inflatable (or otherwise protractible) in some embodiments, and is deflatable (or otherwise retractable) in other embodiments. In one embodiment, skin 204 and/or tube 212 may include exhaust openings with optional valves that facilitate deflating morphable region 200. In another embodiment, rather than pneumatic or hydraulic activation of morphable region 200, a suitable mechanical (or electromechanical) lift-type device is used to displace skin 204 toward or away from base layer 206 as desired. In alternative embodiments, morphable region 200 is configured to automatically activate itself in response to the aerodynamic forces (or changes in the pressure distribution) near morphable region 200, e.g., without limitation, morphable region 200 may be configured such that protrusion 202 is automatically deployed when the angle of attack/lift of first blade 110 becomes sufficiently negative.

In the exemplary embodiment, protrusion 202 is an elongate, continuous, spanwise-extending segment, e.g., without limitation, morphable region 200 may extend from near tip 118 substantially halfway to root 116 along span S. In other embodiments, protrusion 202 extends along any suitable spanwise portion of first blade 110. In one embodiment, rather than protrusion 202 being elongate and extending spanwise, first blade 110 may have an interrupted spanwise arrangement of individual protrusions. In another embodiment, protrusion 202 is a localized, generally circularly shaped bump. Alternatively, first blade 110 may have any suitable protrusion, or array of protrusions, having any suitable shape that facilitates enabling first blade 110 to function as described herein.

As set forth in more detail below, morphable region 200 is disposed on either pressure side 148 or suction side 150, and may be disposed closer to leading edge 152 or trailing edge 154. For example, in one embodiment, morphable region 200 is aligned with spar 138 to facilitate providing added structural support for morphable region 200, i.e., spar 138 is shown in broken lines in FIG. 4 to indicate the optional location of morphable region 200. In some embodiments, when deployed, protrusion 202 of morphable region 200 provides a smooth contour that is substantially free of kinks and other discontinuities that would sharply redirect airflow. In other embodiments, however, morphable region 200 may be configured to produce kink(s) when activated to facilitate disrupting airflow over first blade 110. Notably, first blade 110 may have any suitable number of morphable regions 200 arranged in any suitable manner that facilitates enabling first blade 110 to function as described herein. Furthermore, each morphable region 200 is constructed in any suitable manner that facilitates enabling first blade 110 to function as described herein. For example, in some embodiments, morphable region 200 is configured to displace skin 204 toward or away from base layer 206 using auxetic-type device(s) embedded in or beneath skin 204, e.g., without limitation, shape-giving stringer(s) that change shape in a direction perpendicular to a direction of applied tension.

Figure 5:
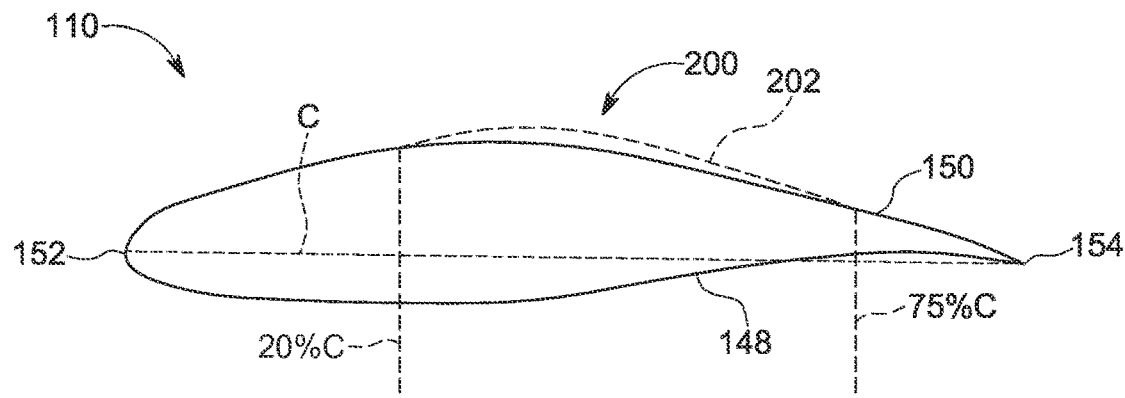
FIG. 5 is a schematic side view of one embodiment of the blade shown in FIG. 3.
Figure 6:
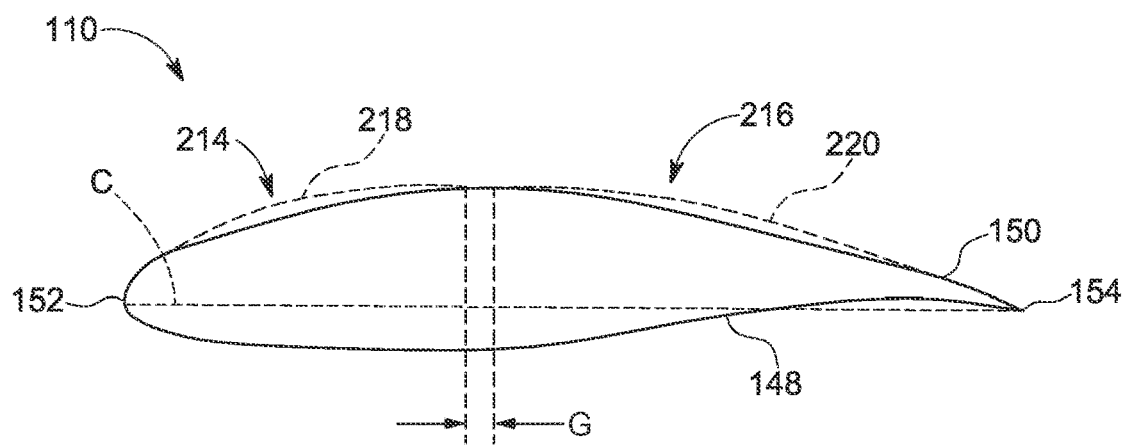
FIG. 6 is a schematic side view of another embodiment of the blade shown in FIG. 3.

FIGS. 5 and 6 are schematic side views of embodiments of first blade 110 with morphable region(s) disposed on suction side 150. Notably, during operation of wind turbine 100, first blade 110 fluctuates between a rough condition and a clean condition as a result of, for example, insects or other debris accumulating near leading edge 152, and being subsequently removed from first blade 110 by rain. As used herein, the term "clean" refers to a state in which first blade 110 has a reduced accumulation of insects (or other debris), and the term "rough" refers to a state in which first blade 110 has an increased accumulation of insects (or other debris).

The accumulation of insects or other debris on first blade 110 can affect the aero-efficiency of first blade 110. For example, the boundary layer state of first blade 110 and, therefore, the power output and the noise output of first blade 110 can be adversely affected. In that regard, control system 136 is configured to determine whether first blade 110 is "clean" or "rough" using data provided to control system 136 by at least one sensor disposed on wind turbine 100, as set forth in more detail below. Furthermore, control system 136 may be configured to operate an activation device, e.g., without limitation, pump 143, to activate morphable region(s) and deploy protrusion(s) on suction side 150 of first blade 110 to facilitate altering the airfoil-shaped profile of first blade 110 based upon whether first blade 110 is in a clean condition or a rough condition. In this manner, higher efficiency and lower noise may be maintained for wind turbine 100 despite the natural tendency of first blade 110 to fluctuate between the clean condition and the rough condition. Optionally, protrusion(s) may also be deployed on pressure side 148 of first blade 110 to facilitate altering the airfoil-shaped profile of first blade 110 based upon whether first blade 110 is in a clean condition or a rough condition. For example, in one embodiment, the morphable region(s) may retract protrusion(s) on pressure side 148 when activated such that the added camber of the retracted protrusion(s) unloads the suction side boundary layer.

Notably, control system 136 may utilize any suitable devices/methods for determining whether first blade 110 is clean or rough. For example, in one embodiment, control system 136 utilizes roughness/contamination sensors that detect the presence of foreign matter on first blade 110 using the light reflective properties and/or capacitive changes of the exterior surface of first blade 110. For example, an outer surface of first blade 110 may be transparent, and an optical sensor may be placed behind the transparent surface such that, when a beam of light is emitted toward the transparent surface, the optical sensor detects the total reflection change of the multiply refracted light. Alternatively, a camera may be placed behind the transparent surface to periodically capture images of the transparent surface such that control system 136 processes the images to detect changes in the transparency of the surface due to the presence of foreign matter on the surface. In some embodiments, control system 136 utilizes transition sensors to detect upstream shifts in the boundary layer transition location of first blade 110 at a plurality of different data points (or, alternatively, control system 136 utilizes flow sensors to monitor the development of the boundary layer rather than the transition location). In other embodiments, control system 136 utilizes sensors that detect the forces imparted to rotor 106 (or first blade 110 in particular) and/or wind turbine 100 as a whole. In that regard, with dedicated control inputs, an instationary response is evaluated in addition to a stationary change of the power curve because the wind field continuously changes and is not easily measured. Optionally, control system 136 determines the clean or rough condition of second blade 112 and/or third blade 114 in addition to, or in lieu of, determining the clean or rough condition of first blade 110.

Referring back to FIG. 2, in the exemplary embodiment, pump 143 is located within hub 108, and control system 136 is communicatively coupled to pump 143. In this manner, to activate the morphable region(s), control system 136 operates pump 143 via I/O conduit 141 such that pump 143 draws in a fluid 145 such as ambient air and discharges pressurized fluid 151 for channeling to blade(s) 110, 112, 114 via a suitable network of fluid conduits. Pressurized fluid 151 is then utilized to deploy the protrusion(s) as set forth herein. In other embodiments, a plurality of pumps and/or at least one pressurized air cylinder is utilized to supply pressurized fluid 151, e.g., without limitation, a pump is disposed in each blade 110, 112, 114 in some embodiments. Alternatively, pump 143 is disposed at any suitable location on wind turbine 100, and pressurized fluid 151 from pump 143 is provided to the morphable region(s) in any suitable manner.

In the embodiment of FIG. 5, first blade 110 has morphable region 200 located on suction side 150 between about 20% of chord C (as measured from leading edge 152) to about 75% of chord C (as measured from leading edge 152), and control system 136 is configured to modulate the deployment of protrusion 202 (i.e., to selectively activate and deactivate morphable region 200) to suit the clean/rough condition of first blade 110. For example, control system 136 is configured to activate morphable region 200 and deploy protrusion 202 when first blade 110 is in a "clean" state, and control system 136 is configured to deactivate morphable region 200 and retract protrusion 202 when first blade 110 is in a "rough" state.

In the embodiment of FIG. 6, a first morphable region 214 and a second morphable region 216 are located on suction side 150 and are separated by a gap G. In some embodiments, gap G is less than 1% of chord C, e.g., without limitation, there is no visually apparent gap between first morphable region 214 and second morphable region 216. In other embodiments, gap G may be about 70% of chord C. For example, in one such embodiment, first morphable region 214 begins, i.e., its upstream margin is located, near leading edge 152, and first morphable region 214 ends, i.e., its downstream margin is located, at about 15% of chord C (as measured from leading edge 152). In the same example, second morphable region 216 begins at about 85% of chord C (as measured from leading edge 152), and second morphable region 216 ends near trailing edge 154. Alternatively, gap G may be any suitable length that facilitates enabling first blade 110 to function as described herein.

Like the embodiment of FIG. 5, control system 136 is configured to selectively activate first morphable region 214 (and, therefore, the deployment of a first protrusion 218) and second morphable region 216 (and, therefore, the deployment of a second protrusion 220) to suit the clean/rough conditions of first blade 110. For example, in one embodiment, only first protrusion 218 is to be deployed when it is determined that first blade 110 is in its rough condition, and only second protrusion 220 is to be deployed when it is determined that first blade 110 is in its clean condition such that first morphable region 214 and second morphable region 216 are alternatingly activated to facilitate maintaining improved airflow over first blade 110 in response to the clean/rough condition of first blade 110. In this manner, a laminar flow region and a region of main pressure recovery of first blade 110 can be altered independently of one another.

Optionally, to suit the location of the main pressure recovery zone of first blade 110, morphable region 200 of FIG. 5, or first morphable region 214 of FIG. 6, may begin at about 5% of chord C (as measured from leading edge 152) and may end from about 50% of chord C to about 75% of chord C (as measured from leading edge 152). Similarly, morphable region 200 of FIG. 5, or second morphable region 216 of FIG. 6, may end at about 98% of chord C (as measured from leading edge 152) to suit the location of the main pressure recover zone of first blade 110 and/or the boundary layer profile at trailing edge 154, e.g., without limitation, to suit adapting the noise performance to the blade state. Alternatively, morphable region 200, first morphable region 214, and/or second morphable region 216 may span any suitable ranges of chord C that facilitate enabling first blade 110 to function as described herein.

Using the embodiments of first blade 110 shown in FIGS. 5 and 6, control system 136 is configured to adapt the contour of the airfoil-shaped profile of first blade 110 to suit the prevailing condition and/or blade contamination of first blade 110, thereby reducing the penalties that would otherwise be associated with utilizing first blade 110 in suboptimal conditions. As a result, the net present value can be increased by increasing the AEP through increasing the rotor diameter and/or the rotational speed with a boundary condition of substantially fixed noise. In terms of graphing the performance of wind turbine 100, activating morphable region(s) 200, 214, 216 in accordance with FIGS. 5 and 6 facilitates manipulating the graphical location and graphical slope of the lift coefficient curve around the operating point to effectively allow flapwise bending moment reductions (peak and/or fatigue), meaning that span S of first blade 110 can be increased with less increase in the amount of structural support material incorporated into first blade 110.

Figure 7:
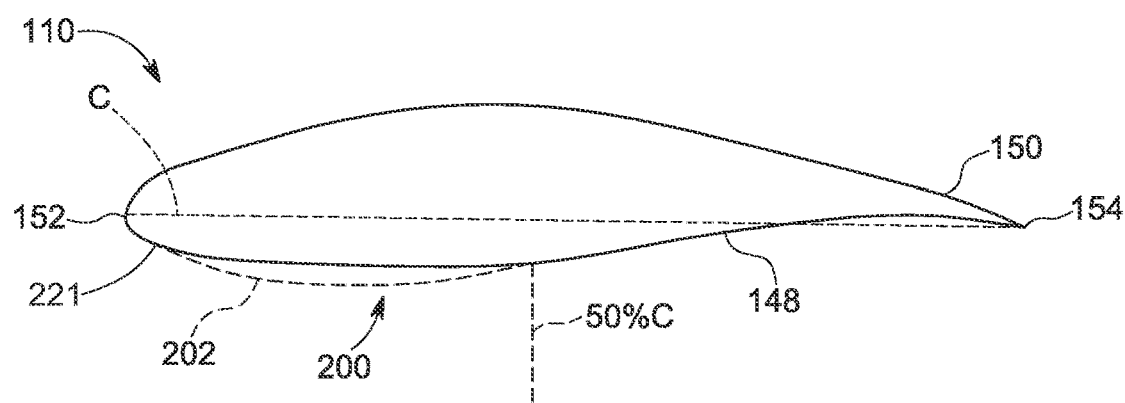
FIG. 7 is a schematic side view of yet another embodiment of the blade shown in FIG. 3.

FIG. 7 is a schematic side view of first blade 110 with morphable region 200 disposed on pressure side 148 near leading edge 152, e.g., without limitation, between leading edge 152 and about 50% of chord C as measured from leading edge 152. Notably, in the embodiment of FIG. 7, morphable region 200 does not traverse leading edge 152. In other embodiments, morphable region 200 may be disposed at any suitable location on pressure side 148 that facilitates enabling morphable region 200 to function as described herein. For example, in one embodiment, morphable region 200 may extend beyond about 50% of chord C as measured from leading edge 152, to about 75% of chord C as measured from leading edge 152. In an alternative embodiment, first blade 110 has morphable regions on pressure side 148 and suction side 150 that are to be activated simultaneously to effect a camber-changing state of first blade 110.

Figure 8:
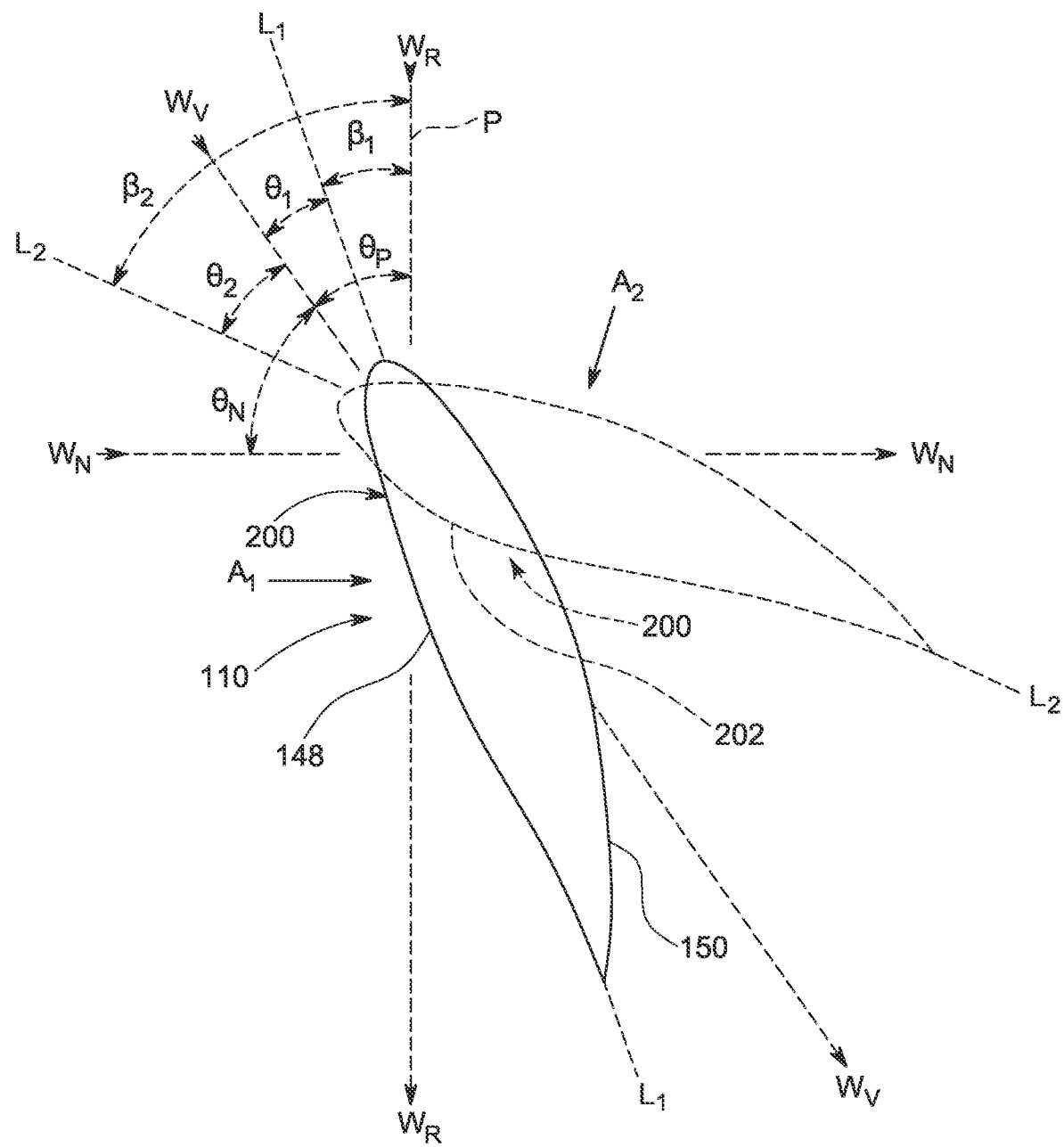
FIG. 8 is a diagram illustrating various operating states of the wind turbine shown in FIG. 1 utilizing the blade shown in FIG. 7.

FIG. 8 is a diagram illustrating various operating states of wind turbine 100 utilizing the embodiment of first blade 110 shown in FIG. 7. More specifically, first blade 110 is shown as having a first airfoil-shaped profile $A_1$ (depicted in solid lines) during a first operating state of wind turbine 100, and a second airfoil-shaped profile $A_2$ (depicted in broken lines) during a second operating state of wind turbine 100. Notably, first airfoil-shaped profile $A_1$ has a first zero-lift line $L_1$, and second airfoil-shaped profile $A_2$ has a second zero-lift line $L_2$.

In the exemplary embodiment, control system 136 controls the wind turbine 100 such that first blade 110 rotates in a rotational plane P (also shown in FIG. 1) and, as a result, experiences a rotational wind $W_R$. Additionally, first blade 110 experiences a natural wind $W_N$ (also shown in FIG. 1) directed substantially perpendicular to rotational plane P. In this manner, first blade 110 experiences a virtual wind $W_V$ that is essentially the vector sum of rotational wind $W_R$ and natural wind $W_N$. Notably, first blade 110 can be oriented within a positive lift range $\theta_P$ defined between virtual wind $W_V$ and rotational wind $W_R$, or a negative lift range $\theta_N$ defined between virtual wind $W_V$ and natural wind $W_N$.

In the first operating state of wind turbine 100, control system 136 controls the pitch of first blade 110 such that, when first blade 110 has first airfoil-shaped profile $A_1$, first zero-lift line $L_1$ is oriented within positive lift range $\theta_P$ at a first orientation $\beta_1$ relative to rotational plane P so as to have a positive lift angle $\theta_1$ relative to virtual wind $W_V$. In such an orientation, the flow of virtual wind $W_V$ over first blade 110 generates positive lift, i.e., a net lift force imparted to pressure side 148. While first blade 110 generates positive lift when first zero-lift line $L_1$ is oriented within positive lift range $\theta_P$ at positive lift angle $\theta_1$ in the exemplary embodiment, first blade 110 is shaped in some embodiments to generate positive lift when chord C (shown in FIG. 7) is oriented within negative lift range $\theta_N$ as well, i.e., first blade 110 is configured in some embodiments to generate positive lift at some negative angles of attack in addition to generating positive lift at positive angles of attack. Of particular note is that, in first airfoil-shaped profile $A_1$ of first blade 110, morphable region 200 has not been activated, and protrusion 202 has not been deployed (and is therefore not shown).

In the event that maneuvering first blade 110 from positive lift angle $\theta_1$ toward its feathered orientation is desired, e.g., without limitation, during shutdown of wind turbine 100, control system 136 adjusts the pitch of first blade 110 to transition first blade 110 from being oriented within positive lift range $\theta_P$ to being oriented within negative lift range $\theta_N$. Such a transitional maneuver causes the pitch of first blade 110 to increase. In the process, first zero-lift line $L_1$ of first blade 110 transitions to second zero-lift line $L_2$, meaning that positive lift angle $\theta_1$ changes to a negative lift angle $\theta_2$. Therefore, the positive lift generated by first blade 110 is reduced due to the change from virtual wind Wv impacting first blade 110 mostly on pressure side 148, to virtual wind Wv impacting first blade 110 mostly on suction side 150. More specifically, by changing from positive lift angle $\theta_1$ to negative lift angle $\theta_2$, first blade 110 rapidly shifts from generating positive lift to generating negative lift, i.e., a net lift force imparted to suction side 150, which causes undesirable bending of first blade 110. As used herein, the term "feathered orientation" refers to a state at which chord C of first blade 110 is said to be substantially coincident with the direction of natural wind $W_N$.

If, during the transition from positive lift angle $\theta_1$ to negative lift angle $\theta_2$, protrusion 202 was to be deployed on pressure side 148 near leading edge 152 of first blade 110 (as shown in FIG. 7), a lift-reducing boundary layer development would result, i.e., the boundary layer would separate earlier along chord C. Moreover, because airfoil thickness and chordwise wall shear would increase, the deployment of such protrusion 202 would result in a reduction in the maximum lift-to-drag ratio. For at least these reasons, in the exemplary embodiment, control system 136 is configured to activate morphable region 200 and deploy protrusion 202 of first blade 110 on pressure side 148 near leading edge 152 to reduce the negative lift and, therefore, the bending moment of first blade 110 when maneuvering first blade 110 from positive lift angle $\theta_1$ toward its feathered orientation. Particularly, control system 136 is configured to activate morphable region 200 such that protrusion 202 is deployed while first blade 110 is maneuvering from first zero-lift line $L_1$ having first orientation $\beta_1$ relative to rotational plane P, to second zero-lift line $L_2$ having second orientation $\beta_2$ relative to rotational plane P, thereby reducing the negative lift generated by first blade 110 when first blade 110 is oriented in negative lift range $\theta_N$ such as, for example, at negative lift angle $\theta_2$. Notably, in the exemplary embodiment, a kink 221 (or discontinuity) (shown in FIG. 7) is formed at the start, or upstream margin, of protrusion 202 (and/or at the end, or downstream margin, of protrusion 202) to facilitate the above-described reduction in negative lift. However, in other embodiments, kink(s) 221 may not be present but, rather, the transition onto protrusion 202 (and/or the transition off of protrusion 202) may be smooth and continuous.

By deploying protrusion 202 in such a manner, the resulting reduction in bending moment enables the load capacity of first blade 110 to be decreased which, in turn, yields a reduction in the material used to fabricate first blade 110. As such, span S of first blade 110 can be increased using less support material than would have otherwise been used if first blade 110 was to be fabricated to withstand the greater bending moments that would occur without deploying protrusion 202 when maneuvering first blade 110 from positive lift angle $\theta_1$ toward its feathered orientation as set forth above. The net present value is therefore increased through material savings by improving an AEP per cost function.

The embodiments disclosed herein therefore facilitate altering the airfoil contour of a wind turbine blade by actively deploying a protrusion on the blade to control the aerodynamic behavior of the blade. Moreover, the embodiments facilitate influencing the boundary layer development of a wind turbine blade by reshaping various regions of the airfoil contour such as, for example: the main pressure recovery region to control separation; the favorable pressure gradient region to shift the natural transition location; and/or the leading edge region to control initial flow conditions for the main pressure recovery. Additionally, the embodiments disclosed herein further facilitate reducing loads on a wind turbine, which enables providing the wind turbine with longer blades that are lighter, i.e., have less mass, due to the reduction in structural support materials that results from the reduced loading. In this manner, the embodiments disclosed herein facilitate modulating the airfoil contour of a wind turbine blade between clean/rough blade conditions, thereby improving the efficiency and reducing the noise of the wind turbine. The devices, systems, and methods thereby facilitate increasing the useful life and efficiency of a wind turbine.

An exemplary technical effect of the methods, systems, and apparatus described herein includes at least one of: (a) altering the airfoil contour of a wind turbine blade by actively deploying a protrusion on the blade to control the aerodynamic behavior of the blade; (b) influencing the boundary layer development of a wind turbine blade by reshaping various regions of the airfoil contour such as, for example: the main pressure recovery region to control separation; the favorable pressure gradient region to shift the natural transition location; and/or the leading edge region to control initial flow conditions for the main pressure recovery; (c) reducing loads on a wind turbine, which enables providing the wind turbine with longer blades that are lighter, i.e., have less mass, due to the reduction in structural support materials that results from the reduced loading; (d) modulating the airfoil contour of a wind turbine blade between clean/rough blade conditions, thereby improving the efficiency and reducing the noise of the wind turbine; and (e) increasing the useful life and efficiency of a wind turbine.

Exemplary embodiments of wind turbines and methods of operating the same are described above in detail. The wind turbines and methods of operating the wind turbines are not limited to the specific embodiments described herein, but rather, components of the wind turbines and/or steps of the methods may be utilized independently and separately from other components and/or steps described herein. For example, the methods may also be used in combination with other systems and methods, and are not limited to practice with only the systems and methods as described herein.

Rather, the embodiments may be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
    at least one blade comprising a pressure side, a suction side, a leading edge, and a trailing edge that define an airfoil-shaped profile, a first morphable region beginning near the leading edge and a second morphable region ending near the trailing edge, wherein the first morphable region and the second morphable region are located on the suction side, the first and second morphable regions being aligned in a chord-wise direction such that the first and second morphable regions are separated by a chord-wise gap extending along a chord of the at least one blade; and
    a control system configured to determine whether the at least one blade is in a clean condition or a rough condition,
    wherein the control system activates only the second morphable region when the at least one blade is in the clean condition, and
    wherein the control system activates only the first morphable region when the at least one blade is in the rough condition.

2. The wind turbine in accordance with claim 1, wherein the first morphable region and the second morphable region are pneumatically activated morphable regions.

3. The wind turbine in accordance with claim 1, wherein the first morphable region and the second morphable region each comprise a tether disposed between a skin and a base layer of the at least one blade to limit displacement of the skin relative to the base layer.

4. The wind turbine in accordance with claim 1, wherein the control system is configured to alternatingly activate the first morphable region and the second morphable region.

5. The wind turbine in accordance with claim 1, wherein the chord-wise gap is at least 70% of the chord of the at least one blade.

6. A wind turbine comprising:
    at least one blade comprising a pressure side, a suction side, a leading edge, and a trailing edge that define an airfoil-shaped profile, a first morphable region beginning near the leading edge and a second morphable region ending near the trailing edge, wherein the first morphable region and the second morphable region are located on the suction side, the first and second morphable regions being aligned in a chord-wise direction such that the first and second morphable regions are separated by a chord-wise gap extending along a chord of the at least one blade, wherein each of the first morphable region and the second morphable region comprise a base layer, a skin covering the base layer, and a substrate disposed between the skin and the base layer to inhibit the skin from bonding to the base layer, and wherein the skin is displaced relative to both the base layer and the substrate to generate a protrusion when the first morphable region or the second morphable region is activated; and
    a control system configured to determine whether the blade is in a clean condition or a rough condition;
    wherein the control system activates only the second morphable region when the at least one blade is in the clean condition, and
    wherein the control system activates only the first morphable region when the at least one blade is in the rough condition.

7. The wind turbine in accordance with claim 6, wherein the control system is configured to alternatingly activate the first morphable region and the second morphable region.

8. The wind turbine in accordance with claim 6, wherein the at least one blade comprises a spar, the first morphable region and the second morphable region being aligned with the spar so as to be supported by the spar.

9. The wind turbine in accordance with claim 6, wherein the first morphable region and the second morphable region are pneumatically activated morphable regions.

10. The wind turbine in accordance with claim 6, wherein a tether is disposed between the skin and the base layer to limit displacement of the skin relative to the base layer.

11. A method of operating a wind turbine, the method comprising:
    adjusting a pitch of a blade, by a control system, such that the blade transitions from a positive lift angle to a negative lift angle, wherein the blade comprises a pressure side, a suction side, a leading edge, and a trailing edge that define an airfoil-shaped profile, a first morphable region beginning near the leading edge and a second morphable region ending near the trailing edge, wherein the first morphable region and the second morphable region are located on the suction side, the first and second morphable regions being aligned in a chord-wise direction such that the first and second morphable regions are separated by a chord-wise gap extending along a chord of the at least one blade; and
    determining whether the blade is in a clean condition or a rough condition;
    activating only the second morphable region in response to determining that the blade is in the clean condition; and
    activating only the first morphable region in response to determining that the blade is in the rough condition.

12. The method in accordance with claim 11, wherein activating the first morphable region or activating the second morphable region comprises inflating a tube disposed between a skin and a base layer of the blade.

13. The method in accordance with claim 12, wherein the tube is inflated using a pneumatic pump coupled in flow communication with the tube.

14. The method in accordance with claim 12, further comprising limiting a displacement of the skin relative to the base layer using a tether that couples the skin to the base layer.

15. The method in accordance with claim 11, wherein the first morphable region the second morphable region are alternately activated.

* * * * *